United States Patent [19]

Fried et al.

[11] 4,062,121
[45] Dec. 13, 1977

[54] DEVICE FOR COMPARING THE DIMENSIONAL PROPORTIONS OF TAPERED OBJECTS

[76] Inventors: Joseph Nicholas Fried; Jelena Maria Fried, both of 1691 Coventry Road, Cleveland Heights, Ohio 44118

[21] Appl. No.: 699,043

[22] Filed: June 23, 1976

[51] Int. Cl.² .......................... G01B 3/22; G01B 5/00
[52] U.S. Cl. ................................ 33/169 R; 33/174 P
[58] Field of Search ............ 33/174 P, 174 R, 174 L, 33/169 R, 147 E; 84/458, 456, 364, 383 A

[56] References Cited

U.S. PATENT DOCUMENTS

| 2,433,421 | 12/1947 | Bowness | 33/174 L |
| 3,477,133 | 11/1969 | Armato | 33/147 E |

FOREIGN PATENT DOCUMENTS 854,498  11/1960  United Kingdom ............... 33/174 P Primary Examiner—Harry N. Haroian

[57] ABSTRACT

A device for comparing dimensional proportions of at least two tapered objects, such as musical instrument reeds, so as to determine where a given thickness exists on one object, relative to the position of that given thickness on the other object. The device is comprised of a base over which two height sensors are mounted in such a way that the movement of one height sensor imparts a proportional movement to the other height sensor. A sliding double-edged reference bar and indicia on the base allow for the positioning and comparison of different areas of the tapered objects.

10 Claims, 6 Drawing Figures

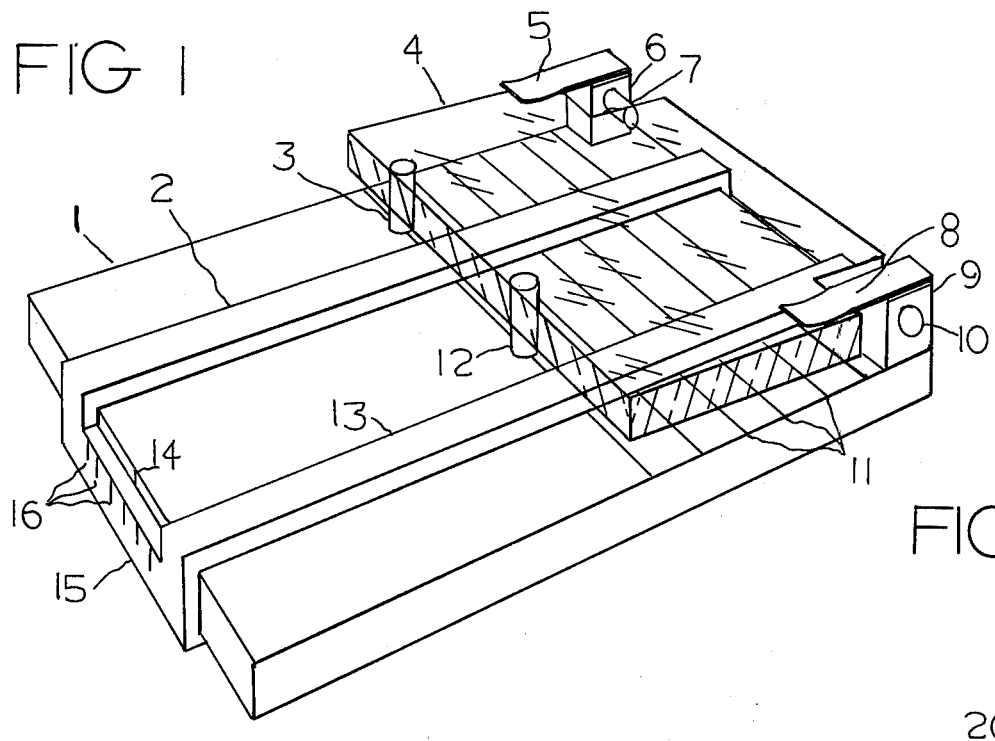
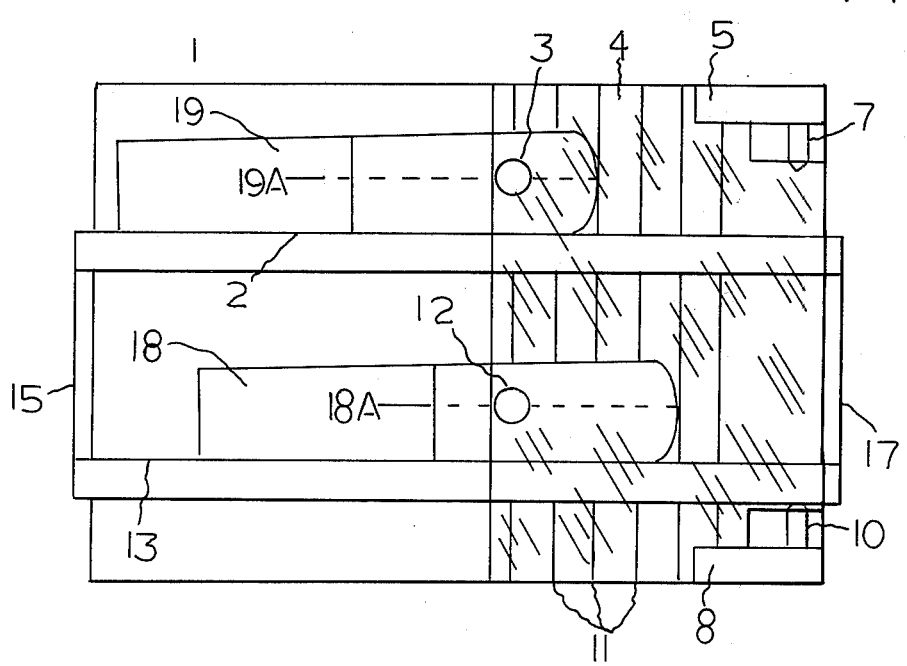
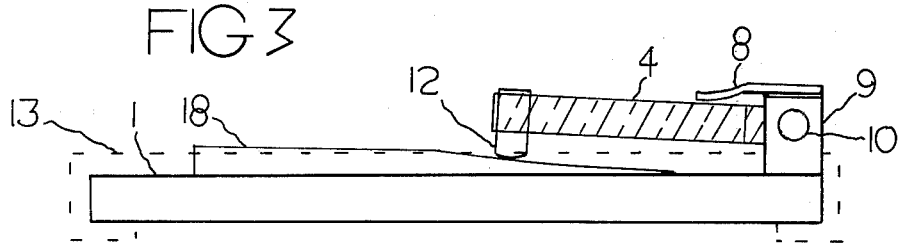

DEVICE FOR COMPARING THE DIMENSIONAL PROPORTIONS OF TAPERED OBJECTS

OBJECTS AND SUMMARY OF INVENTION

This invention relates to a device useful for comparing the dimensions of tapered objects such as musical instrument single reeds of the type used on clarinet and saxophone. It should be understood that, although the invention will be described primarily in relationship to musical reeds, its uses are not limited to such. The dimensions of other tapered objects can also be compared with our device.

Musical instrument reed dimensions are critically important to the quality of sound production possible on reed musical instruments. As manufactured reeds tend to be highly inconsistent, necessitating the musician to adjust many of his reeds, with a knife or other shaping tool, in order to receive uniformity of sound production. Usually, in a box of ten or twenty manufactured reeds, the musician will find a few which readily play well, or at least much better than the rest of the reeds in the box.

Our invention enables the musician to use his best reeds as dimensional standards against which he can measure his inferior reeds. Then, with the use of conventional reed-shaping tools, he can adjust the inferior reeds to more closely correspond to the dimensions of his best reeds.

The method in which our device functions can be summarized as follows. Two reeds, or similar tapered objects, are selected, one of which has superior dimensional proportions and which is designated as the model or standard reed. A point is located on the model reed which is equal in thickness to a point which is located on the second reed. The position of the point on the model reed is compared to the position of the point on the second reed and appropriate shaping work is then done on the second reed in order to make its dimensions more like those of the model.

The use of one particular reed-shaping tool, known as the reed clipper, is especially benefited by the manner in which our invention compares reeds. The reed clipper is a tool which cuts material off the thinner end of a reed without eliminating the curved contour which all conventional reeds have. A feature of our device is that it can indicate to the user exactly how much material should be clipped off.

A summary of other features of our invention follows: It is simple to operate, even by an unskilled person, because the reeds need not be clamped into position. They are merely inserted freely into the device. In addition, the thickness sensors need not be locked or set into position. They can be repositioned simply by sliding the model reed up or down to a new location. Also, the user does not have to concern himself with absolute thickness measurements or figures. Because the reeds are laid out side by side, in close proximity, and because of the sensitivity of the device, the user can usually perceive dimensional differences by comparing one reed in direct reference to the other. Additional reference means, namely, scribed lines, are added, however, for use in comparing reeds of very similar dimensions, and for the benefit of those who desire absolute measurements. Simplicity of construction is accomplished by connecting the thickness sensors to a common axis, and to each other, by means of a transparent connecting member. Because it is transparent, the connecting member can be made from one solid piece of material without impeding the view of the reeds and scribed lines. Furthermore, the device is simple and sturdy enough to be economical, and well-suited for transport in a typical musical instrument case.

These advantages, and others, will be more readily perceived when reference is made to the following written description taken in conjunction with the accompanying drawings of the preferred form of our invention.

DESCRIPTION OF DRAWINGS

FIG. 1 shows one form of our device in perspective and in accordance with our invention.

FIG. 2 is a top view of the device with two reeds in operational position, and with broken lines drawn on the reeds for instructional purposes.

FIG. 3 is a side view with the reference surface shown in phantom in order to expose a reed in operational position.

FIG. 4 is a top view of a typical clarinet reed.

FIG. 5 is a side view of a typical clarinet reed, showing that it has a flat surface opposing a tapered surface.

FIG. 6 is a cross-sectional view of a typical clarinet reed which shows that the tapered surface is also convex.

DETAILED DESCRIPTION OF EXEMPLARY EMBODIMENT OF INVENTION

As illustrated in FIG. 1, our device comprises a flat base member 1 having two rear posts 6 and 9 which support pivot rods 7 and 10 respectively, which movably connect to a transparent top member 4. Pushing downward against the transparent top member 4 are two flat springs 5 and 8 which are connected to rear posts 6 and 9. Two thickness sensors 3 and 12 are connected to the top member 4 and extend downward towards the base member 1.

On the base member are scribed lines 11 which transverse the base member and which might be spaced one or two millimeters apart, approximately. Sliding over the base member and perpendicular to its longitude are two reference surfaces 2 and 13, each of which extends the length of the base member and then turns perpendicularly downward and inward in such a way as to wrap around the ends of the base member. The reference surfaces are connected to one another by a cross member on each end. Cross member 15 is shown in FIG. 1, and both cross members 15 and 17 are shown in FIG. 2. Located on cross member 15 are scribed lines 16, and adjacent to them, on the base member, is another scribed line 14.

The top view of the device, shown in FIG. 2, includes illustrations of two reeds 18 and 19 which are shown in operational position. Reed 18 is contacted by thickness sensor 12 and reed 19 is contacted by thickness sensor 3. On reed 18 an instructional line 18A has been drawn, which is parallel to the reference surfaces and passes directly beneath the center of thickness sensor 12. On reed 19 a line 19A has been drawn which is also parallel to the reference surfaces and which passes directly beneath the center of sensor 3. The distance from each line to its adjacent reference surface is equal.

FIG. 3 shows the reference surface 13 in phantom so as to expose a view of the reed. The ends of the reference surface envelope the ends of the base member and the elastic tension exerted by the ends of the reference surfaces against the base member is sufficient to keep the reference surfaces stable during operation of the device. However, appropriate manual force can slide the reference surfaces in either direction perpendicular to the longitude of the base.

FIG. 4 shows a top view of a clarinet reed with a typically curved tip contour 20. It is at the tip that the reed is thinnest, as can be seen in the side view shown in FIG. 5, where the tip is also indicated as 20. Also, in FIG. 5, it can be seen that one side of the typical clarinet reed is flat while the opposing side is tapered. In addition, the side which is tapered is also convex as can be seen in the cross-sectional illustration in FIG. 6.

The operation of the device is as follows. A superior model reed, which we shall designate as 18 to coincide with the drawing, is placed with its flat side against the base member 1, and its right edge against the reference surface 13. It is then moved in the direction of its tip until its tip wedges between the thickness sensor 12 and the base member 1. After reaching this point the model reed can still be pushed in further until its tip reaches any one of the scribed lines, but a small increase in force will be required since it is now functioning as a wedge which is spreading the thickness sensor apart from the base. Of course, as the thickness sensor moves upward, so does the sprung transparent top member 4, to which it is connected. And so also does the other thickness sensor 3. In fact, thickness sensor 3 will be positioned, at all times, exactly the same distance over the base as thickness sensor 12, due to their common connection to an axis parallel to the base member.

After model reed 18 has been positioned so that its tip is even with one of the scribed lines, the other reed 19 is also placed on the device, flat side down, with its right side against the reference surface 2. It is lightly moved in the direction of its tip only until it starts to wedge between the thickness sensor 3 and the base 1. At this point the thickness of inferior reed 19 under thickness sensor 3 should be the same as the thickness of model reed 18 under thickness sensor 12.

It remains to compare the distances which each reed has moved passed its adjacent thickness sensor. If the reeds have moved to the same scribed line then their proportions for that particular thickness are the same and need no correction. If, as is the case illustrated in the drawings, inferior reed 19 has not moved in as far as model reed 18, then reed 19 has to be scraped with a knife or other suitable means, at and below the area contacted by thickness sensor 3, until it slides up to the same scribed line as model reed 18. However, if inferior reed 19 has moved in further than model reed 18, then reed 19 has to be shortened with a conventional reed clipper.

The amount to be clipped can be easily determined by simply subtracting the number of scribed lines passed by the tip of the model reed from the number of scribed lines passed by the tip of the inferior reed. If for example, the superior reed has moved to the fourth scribed line and the inferior reed has moved to the sixth scribed line, the inferior reed will have to be clipped two units. If the device has been made with increments of say one millimeter, then the inferior reed will be shortened by two millimeters.

To compare other areas of the reeds one has merely to repeat the operation, but this time with the tip of the model reed against a different scribed line. By simply repositioning the model reed in this way, one can compare the reeds along a series of points, equally spaced inward from the right edge of each reed. For example, instructional lines 18A and 19A contain all of the points which can be compared on reeds 18 and 19 by merely moving model reed 18 less or more along the base.

In order to compare other areas of the reeds, the user slides the interconnected reference surfaces 2 and 13 in either direction perpendicular to the longitude of the base and as much as desired. Then he can proceed with the comparison operation previously outlined. To determine exactly where the reference surfaces are in relation to the sensors, scribed lines 16 are on the connecting bar 15 for reference with line 14 on the base member 1.

Further operational suggestions follow. One should try to survey all areas of the reeds by choosing representative comparison spots. The clipping work should be done first because clipping the reed will affect the measurement of all areas of the reed, whereas scraping the reed will only affect the measurement of the area scraped. Also, pencil marks can be placed on the reed while it is on the device in order to help the user remember what parts need to be scraped. Other procedural variations and techniques will probably become apparent to the user with practice. Using this device one can usually survey a reed in a few seconds. Alterations of the reed usually can be affected, with the guidance of our invention and standard reed tools, in a matter of a few minutes.

The parts of the device illustrated can be made of various materials such as metal, plastic, wood or glass, with the exception of the top member, which ideally should be transparent. Clear plastic seems to work well for this piece. Many structural variations are possible and within the contemplation of this invention. For example, if transparent material is not used, then the thickness sensors can be attached to a top member which has a void between the sensors and the connecting axis big enough to permit viewing of the reeds and scribed lines. Furthermore, although it is ideal to keep the reeds side by side so that they can serve as direct reference for each other, it is not essential for the construction of this device. Still again, the thickness sensors need not be connected to a common axis in order to move proportionally to one another, although we believe that the use of the common axis is the simplest and thus best method of manufacture.

The construction of the sliding reference surfaces as illustrated is also ideal but not essential. As depicted in the drawings the reference surfaces can be manufactured very efficiently and accurately with a simple, one-piece stamping operation. And due to their elastic tension, they can be assemble to the base member of the device without additional fastening means. But obviously, numerous other methods of constructing reference means are possible. As another variation the reference surfaces can be fixed so that they do not move at all and instead the sensors can be made to move perpendicularly to the longitude of the reeds. One final example of variations will be given: More than two thickness sensors and reference surfaces can be used so that several reeds can be compared at once.

It is our belief that this invention provides a novel and useful means for comparing the measurements of tapered objects, particularly musical instrument reeds. Variations of form, construction, arrangement and material are possible without departing from the spirit and scope of our invention, and we do not wish to be restricted to the specific form shown or uses mentioned except as defined in the accompanying claims.

We claim

1. A device for comparing the dimensions of at least two tapered objects, such as musical instrument reeds, each having opposed major surfaces and side edges extending in its elongated direction, comprising a substantially flat and smooth base member for slidably supporting a first object upon one of said first object's, major surfaces and for slidably supporting at least a second object upon said second object's corresponding major surface, a first thickness sensor and at least a second thickness sensor, extending towards said base member from predetermined, fixed positions on a member mounted on the device to be movable in a direction essentially perpendicular to said base member, so that the movement of either of said thickness sensors imparts a proportional movement movement through said movable member to the other thickness sensor, said thickness sensors always being substantially equidistant from said base member, first reference means on the device by which said first thickness sensor contacts said first object on a point along a longitudinal line on its surface and said second thickness sensor contacts said second object on a point along a line on its surface which is parallel to and corresponding to said longitudinal line on said first object, there being at least one such pair of corresponding lines, and second reference means on the device for comparing and measuring the longitudes of said tapered objects beyond points of equal thickness, as located by said thickness sensors.

2. A device as set forth in claim 1 wherein said first reference means comprises a first reference surface on said base member for receiving said a side edge of first tapered object and a second reference surface on the base member for receiving a corresponding side edge of second tapered object, said first reference surface being adjacent to and spaced from said first thickness sensor and said second reference surface being adjacent to and spaced from said second thickness sensor, said distances being substantially equal.

3. A device as set forth in claim 2 wherein said reference surfaces are slidably mounted on the base to permit movement perpendicular to their longitude, and said reference surfaces are interconnected and fixed at predetermined spacing by at least one connecting member, in such a way that when said first reference surface is moved relative to said first thickness sensor, said second reference surface moves a substantially equal distance relative to said second thickness sensor.

4. A device as set forth in claim 3 wherein said reference surfaces extend beyond the edges of said base member, and envelope said edges snugly, so as to hold said reference surfaces operably stable in relation to said base member, yet permit slidable movement of said reference surfaces in a direction perpendicular to their longitude, when appropriate and sufficient manual force is applied.

5. A device as set forth in claim 2 wherein indicia is affixed to the device so as to measure the relationship between said base and said slidable reference surfaces.

6. A device as set forth in claim 2 wherein said reference surfaces are positioned on said base member substantially parallel to each other, said thickness sensors contact a common line on said base member which is perpendicular to said reference surfaces, and with indicia on said base member comprising of substantially equally-spaced parallel lines, the first of which lies directly under and between said thickness sensors, and the others extending in the direction of the diminishing thickness of said tapered objects.

7. A device as set forth in claim 1, including tension means on the device, acting on said thickness sensors and said base member, in such a way that a force is required to increase the separation between said thickness sensors and said base member, of such a magnitude that at least noticeably more effort is required to slide said tapered objects on said base member when in contact with said thickness sensors, than when not in contact with said thickness sensors.

8. A device as set forth in claim 7 wherein said tension means is comprised of a force means acting on said thickness sensors in substantially the direction of said base member, and a force means acting on said base member in substantially the direction of said thickness sensors, in such a way that said thickness sensors are inclined to come into snug contact with said base member and with said tension means exerting force of a magnitude insufficient to prevent the separation of said thickness sensors and said base member, when said tapered objects are slid between said thickness sensors and said base member.

9. A device as set forth in claim 1 wherein said movable member is connected in pivotal relation to said base member.

10. A device as set forth in claim 1 wherein said movable member is constructed from transparent material, so as to enable clear observation of said tapered objects and to simplify the construction of said device.

* * * * *